US008223771B2

(12) United States Patent
Fang

(10) Patent No.: US 8,223,771 B2
(45) Date of Patent: Jul. 17, 2012

(54) SYSTEMS AND METHODS FOR TRANSPORTING DATA ACROSS AN AIR INTERFACE USING REDUCED ADDRESS HEADERS

(75) Inventor: Guichang Fang, Shanghai (CN)

(73) Assignee: Adaptix, Inc., Carrollton, TX (US)

( * ) Notice: Subject to any disclaimer, the term of this patent is extended or adjusted under 35 U.S.C. 154(b) by 572 days.

(21) Appl. No.: 11/651,238

(22) Filed: Jan. 9, 2007

(65) Prior Publication Data

US 2008/0137567 A1    Jun. 12, 2008

(30) Foreign Application Priority Data

Dec. 8, 2006   (CN) .......................... 2006 1 0162069

(51) Int. Cl.
*H04L 12/28* (2006.01)
(52) U.S. Cl. .................. 370/392; 370/328; 370/401
(58) Field of Classification Search .................. None
See application file for complete search history.

(56) References Cited

U.S. PATENT DOCUMENTS

| 6,006,275 | A * | 12/1999 | Picazo et al. ............... 709/249 |
| 2002/0191561 | A1 * | 12/2002 | Chen et al. ................. 370/331 |
| 2005/0147097 | A1 * | 7/2005 | Chari et al. ................ 370/392 |
| 2006/0020617 | A1 | 1/2006 | Grimminger et al. |
| 2006/0200673 | A1 * | 9/2006 | Zhang et al. ................. 713/176 |
| 2006/0251115 | A1 * | 11/2006 | Haque et al. ................. 370/466 |
| 2006/0274745 | A1 | 12/2006 | Wang et al. |
| 2007/0086434 | A1 * | 4/2007 | Venkatachalam et al. .... 370/352 |
| 2007/0201490 | A1 * | 8/2007 | Mahamuni ............... 370/395.54 |
| 2010/0150124 | A1 * | 6/2010 | Duenyas ..................... 370/338 |

OTHER PUBLICATIONS

International Search Report and Written Opinion issued for PCT/US2007/086252; Dated: Apr. 2, 2008; 9 Pages.
"Analysis and Optimization of QoS Mechanism of MAC layer of IEEE802.16 protocol", dated Jan. 31, 2006; 68 pages.
"Design and Achievement of WiMax Wideband Wireless Metropolitan Area Network System" dated Mar. 21, 2006; 81 pages.

* cited by examiner

*Primary Examiner* — Bob Phunkulh
*Assistant Examiner* — Jenkey Van
(74) *Attorney, Agent, or Firm* — Martin & Ferraro, LLP

(57) ABSTRACT

Systems and methods are disclosed for transporting data across an air interface using a blending of protocol layers to achieve reduced bandwidth. Advantage is taken of the fact that the extra overhead from, for example, the Ethernet protocol is addressing information pertaining to the destination of the packet. This destination information (for example, the Ethernet address) can be stripped from the transmission prior to the air interface and recreated after the air interface. In one embodiment, the concepts of a proper Layer 2 CS are merged on top of the 802.16 protocol and still retain the benefits of a Layer 2 transparent bridged service layer to the network layer. In one embodiment, the MAC address of the destination is used for the air interface and the Ethernet address is recreated and added on the far side of the air interface.

13 Claims, 2 Drawing Sheets

SYSTEMS AND METHODS FOR TRANSPORTING DATA ACROSS AN AIR INTERFACE USING REDUCED ADDRESS HEADERS

RELATED APPLICATIONS

This application is related to and claims priority to Chinese Application No. 200610162069.x filed Dec. 8, 2006 entitled "SYSTEMS AND METHODS FOR TRANSPORTING DATA ACROSS AN AIR INTERFACE USING REDUCED ADDRESS HEADERS", the disclosure of which is hereby incorporated herein by reference.

TECHNICAL FIELD

This invention relates to wireless systems and more particularly to such systems having protocols for data transmission and even more particularly to systems and methods for transporting data across an air interface using reduced addressing headers.

BACKGROUND OF THE INVENTION

It has become common place to transport data across air interfaces. In most such situations, bandwidth becomes a factor either because a single user (such as a PC) is trying to move large data files in a given period of time or several users are trying to use the same air interface to move smaller files.

Many data transportation protocols are now in use, some of which deal with wireline interconnections (such, for example, the 802.3 protocol) and some of which deal with air interface transmissions (such as, for example, 802.16). These protocols have several layers, including the physical layer and several operational layers. Each such layer is designed to accomplish a certain objective and each such layer requires a certain format of data. For example, in addition to transportation of the payload (typically data), address information must be included as a header so that the payload can be delivered to the proper destination. In some situations, it is necessary to use additional protocols for specific purposes. When this is necessary, the additional protocol adds overhead (data bits) to the communication payload.

One example of the problem is when an Ethernet header is necessary on a packet to deliver the packet to a particular location within, for example, a local area network. The overhead from the header is not a problem for those portions of the communication channel (for example, the wireline portions) where bandwidth is essentially unlimited. However, when the communication must pass across an air interface using a specific protocol, such as, for example, the 802.16 protocol, the addition of the Ethernet address in the protocol is a burden on the air interface as it adds bytes (typically 14 bytes). These extra bytes are overhead to the data being transferred across the air interface and in many situations is excessive, particularly for low data rate transfers.

One solution to the problem is to carry the IP on top of an IP convergence sub-layer (IPCS) which would then naturally fall on top of the 802.16 frame in Layer 3. The advantage of such an approach is that it is very efficient because it is IP on top of IP with no additional overhead, or very little additional overhead. The downside is that Layer 3 is designed to carry network routing data and data loads and thus network administrators are not willing to be impacted by the overhead of managing very large (in terms of data flow) Layer 3 traffic. Such a network architecture would be unyielding and difficult to deploy in practice.

BRIEF SUMMARY OF THE INVENTION

The present invention is directed to systems and methods for transporting data across an air interface using a blending of protocol layers to achieve reduced bandwidth. Advantage is taken of the fact that the extra overhead from, for example, the Ethernet protocol is addressing information pertaining to the destination of the packet. This destination information (for example, the Ethernet address) can be stripped from the transmission prior to the air interface and recreated after the air interface. In one embodiment, the concepts of a proper Layer 2 CS are merged on top of the 802.16 protocol and still retain the benefits of a Layer 2 transparent bridged service layer to the network layer. In one embodiment, the MAC address of the destination is used for the air interface and the Ethernet address is recreated and added on the far side of the air interface.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1A illustrates a packet of data moving from a PC across the air interface to an access router to the network;

FIG. 1B illustrates a packet of data moving from the access router to the PC across the air interface;

DETAILED DESCRIPTION OF THE INVENTION

Figure 1:
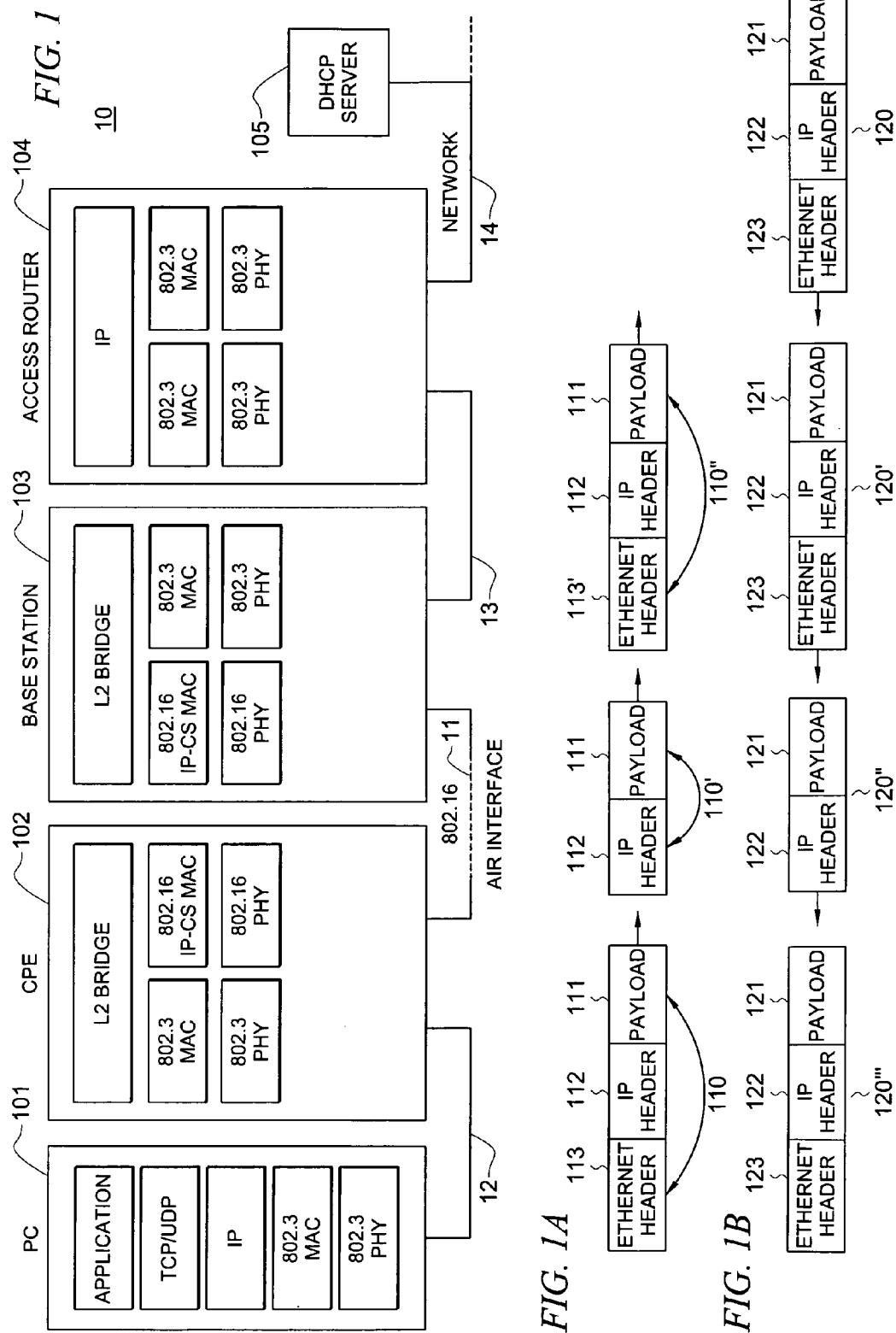
FIG. 1 shows an example of a local area network based system having an air interface in accordance with the invention.

FIG. 1 shows an example of a local area network based system 10 having air interface 11 in accordance with the invention. In the illustrative system, PC 101 is connected to CPE 102 via high capacity connection 12, which connection can be wireline and could use the 802.3 protocol, if desired. CPE 102 is connected to base station 103 via air interface 11. The air interface can use, for example, the 802.16 protocol.

Base station 103 is in turn connected to access router 104 via high bandwidth connection 13 and the router is connected to the network (for example, the Internet) via connection 14.

The 802.16 protocol used for air interface 11 has two layers (layers 2 and 3) over which data can be transported. Layer two is the primary data transfer layer while layer three handles primarily networking information. Layer two is designed to handle MAC (or IP addresses) addresses and not designed to handle Ethernet addresses. Thus, as shown in FIG. 1A, for data packets having an Ethernet header (such as header 113) additional data would have to be embedded in data packet 110. Thus, as it will be seen, the concepts discussed herein will operate to allow data packet 110 from PC 101 to cross air interface 11 as packet 110' without portion 113. Reconstructed portion 113 (called portion 113') pertaining to the destination (such as access router 104) is added by base station 103 on the far side of the air interface to form new data packet 110". The information that is carried in the Ethernet header 113' of packet 110" is the original destination Ethernet address as recreated by base station 103.

As will be seen, this arrangement is an efficient use of Layer 2 CS, such as IP-CS MAC used on top of 802.16. In essence, then this is a Layer 2.5 protocol for use with 802.16. As will be seen, this layer uses additional services, such as a proxy function that would be used in conjunction with the IP-CS, as well as a DHCP snooping function to complement the IP-CS that is bearing the IP user application traffic. The combination of these features allows the effective appearance of a transparently bridged Layer 2 network from the network administrator and network traffic perspective, yet yields the benefit of a very low overhead system by effectively having almost no Layer 2 overhead in the network.

FIG. 1B illustrates a packet of data 120 moving from access router 104 to PC 101 across air interface 11. In operation, as will be discussed, data packet 120, which contains data payload 121 and MAC address 122 of the destination, has LAN network address (Ethernet header) 123 appended thereto for delivery to base station 103. Base station 103, in turn, strips header 123 from packet 120' to form packet 120" in preparation for transportation across air interface 11. CPE 102 then adds reconstructed destination (PC 101) Ethernet header 123' to form packet 120'.

One embodiment is operative when the system uses statically configured addresses. In such a system, the access router tells the base station the Ethernet address information of the destination during the authentication process. The base station then forwards this information, (such as CPE ID (MAC address) IP, netmask, etc.) to the CPE for temporary storage thereat. This information then allows the CPE to recreate a destination Ethernet address based on the IP-CS information that is part of the MAC address that is not stripped from the data packet.

Thus, since both the CPE and the base station have the Ethernet address stored for a given IP CS address, the Ethernet address can be stripped off and then recreated on the far side of the air interface.

In one embodiment, in the situation of dynamically configured addresses, there is a DHCP helper resident in the CPE. DHCP spoofing is contained in the base station. Thus, when a PC initiates the DHCP process to obtain a network address for a given session both the CPE and the base station will learn and remember the assigned addresses.

When an ARP request identifying the PC (a request asking where a packet is to be delivered) is found in the base station's look-up table, the base station will respond as if it were the PC destination. The packets will then be delivered to the base station, using the base station's address and the base station will forward the packet the CPE. The CPE, having the same information in its look-up table as did the base station, then adds the Ethernet address for delivery to the PC.

When an ARP request identifying a destination comes from the PC, the CPE responds with its own MAC address. The PC then sends the packets to the MAC address of the CPE. This then eliminates the need for the Ethernet header in the packet to the base station. The base station then adds the proper Ethernet header because the base station saved the response from the DHCP server. The packets will then be delivered to the router in accordance with the proper Ethernet destination address.

Figure 2:
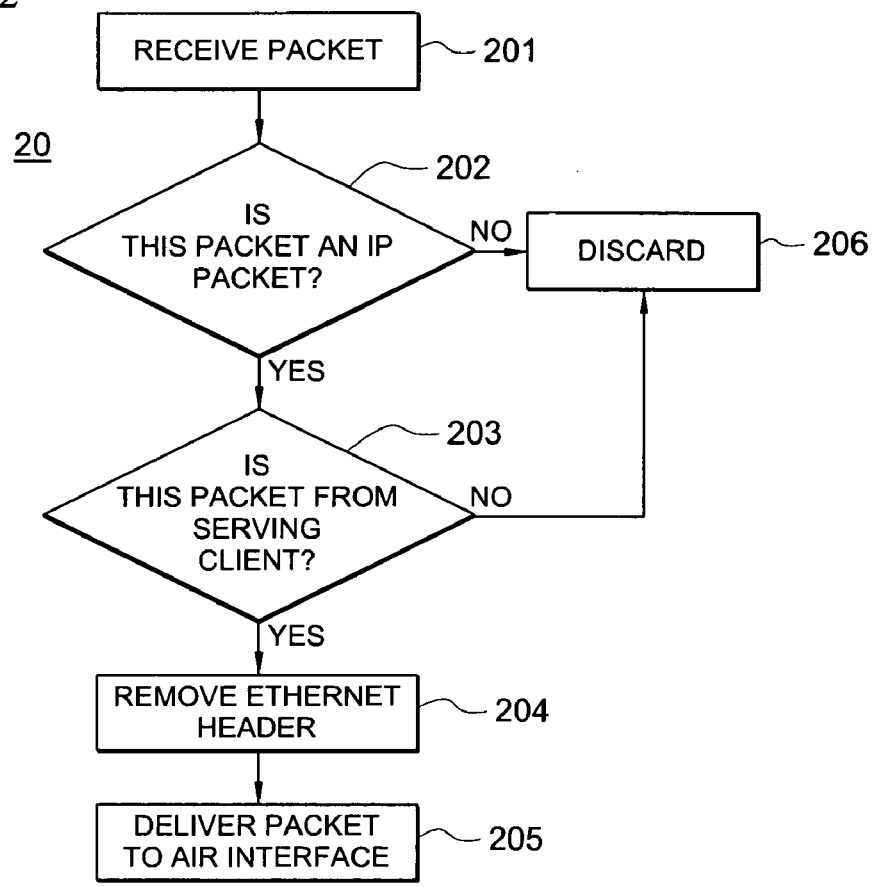
FIG. 2 shows one embodiment of a method for removing headers from air interface transmission.

FIG. 2 shows one embodiment 20 of a method for removing headers from air interface transmission. Process 201 receives a packet for delivery to a destination identified by a header. In some embodiments, the destination header will not be attached because the device (such as a base station) will have told the router to use its address and then "knows" where to deliver the packet.

Process 202 determines if the packet is an IP packet or not. If not, the packet will be discarded by process 206. If it is a packet, then process 203 determines if the packet comes from its serving client's list. If so, then process 204 removes the destination header and process 205 delivers the packet to the air interface.

Figure 3:
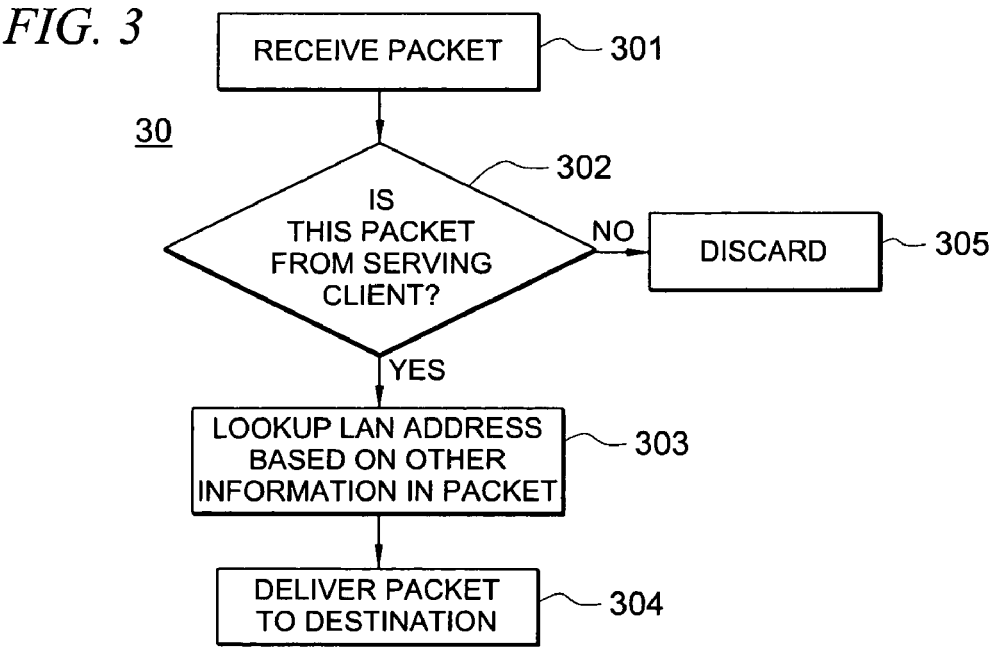
FIG. 3 shows one embodiment for adding headers to air interface transmissions.

FIG. 3 shows one embodiment 30 for adding headers to air interface transmissions. Process 301 receives packets over the air interface. Process 302 determines if this packet is from a serving client. If not, process 305 discards the packet. If so, then process 303 looks up (or otherwise obtains) the desired destination and process 304 delivers the received packet in accordance with information obtained locally (at the received end of the air interface).

From the DHCP snooping point of view, the system actually snoops the DHCP packet at both the CPE and base station so that the bridge knows how to route the IP packets. The system spoofs the MAC address of the CPE which is really the SSID of the device. The subscriber station identity has the MAC address format. In this manner the access router doesn't know that the bridge is operating in a Layer 3 mode since the operation appears to be a pure Layer 2 operation across the bridge.

The base station and CPE snooping functions, in one embodiment, resides on both the CPE and the base station. There are, in one embodiment, two sub-group proxy ARP functions. One proxy ARP function resides in the base station which is a proxy that responds to the access router's down link request for the location of the destination device matching a given address. The other proxy ARP function resides, in one embodiment, on the CPE side and operates to handle destination request information from the sending device on an uplink request.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for delivering data packets across an air interface, said method comprising:
   receiving a data packet at a first physical location on one side of said air interface, said packet having a destination location bearing a specific LAN address in addition to its network address, wherein said packet contains said LAN address of said destination; and
   transmitting said packet across said air interface without said LAN address, said LAN address being added at a second physical location to said data packet using at least one look-up table keyed to said LAN address,
   said added LAN address is derived at least in part from an IP convergence sub-layer (IP-CS) information contained in said packet and at least in part from information stored at said second location for delivering said transmitted packet to said destination location.

2. The method of claim 1 wherein said packet is received across said air interface at said second physical location, said destination location determined, at least in part, from other information contained within said packet and at least in part from information stored at said second location.

3. The method of claim 2 wherein said first physical location removes said LAN address from said packet prior to said transmitting said packet across said air interface.

4. The method of claim 1 wherein said first and second locations contain transmit and receive ends, respectively, of an air interface bridge, and wherein said air interface is the 802.16 protocol.

5. The method of claim 4 wherein said transmission uses at least a portion of a Layer 2 protocol of said bridge.

6. A bridge for use in transporting data packets across an air interface between equipment located on either side of the interface, said data packets deliverable to a destination location based upon the Ethernet address of said destination location, said bridge comprising:
   means for sending, on a transmit side of said bridge, said data packet across said air interface without said Ethernet address attached to said packet; and
   means for controlling, on a receive side of said bridge, the delivery to a proper destination of data packets arriving without Ethernet addresses attached thereto;
   wherein said means for sending said data packet and said means for controlling the delivery are on different sides of said air interface;
   wherein said controlling means comprises:
   means for adding the Ethernet address of said destination location to received ones of said data packets using at least one look-up table keyed to said Ethernet address, wherein said adding means comprises at least one look-up table for determining said Ethernet address based on IP-CS information contained in said data packet.

7. The bridge of claim 6 wherein said sending means comprises:
   means for removing the Ethernet address from data packets prior to said sending, wherein said data packets contain said Ethernet address prior to removal.

8. The bridge of claim 6 wherein said look-up table is populated for a particular session in response to an ARP request from a data packet sending location.

9. A method of operating a bridge for transporting data packets across an air interface between equipment located on either side of the interface, said data packets deliverable to a destination location based upon the Ethernet address of said destination location, said method comprising:
   sending, from a transmit side of said bridge, said data packet across said air interface without said Ethernet address attached to said packet, wherein said data packet includes said Ethernet address prior to sending; and
   controlling, at a receive side of said bridge, delivery to a proper destination of data packets arriving without Ethernet addresses attached thereto;
   adding, at said receive side of said bridge, the Ethernet address of said destination location to received ones of said data packets using at least one look-up table keyed to said Ethernet address, wherein said adding comprises determining said Ethernet address based on IP-CS information contained in said data packet.

10. The method of claim 9 wherein said sending comprises:
    removing the Ethernet address from data packets prior to said sending.

11. The method of claim 10 wherein said determining comprises:
    using at least one look-up table keyed to said IP-CS information.

12. The method of claim 11 wherein said look-up table is populated for a particular session in response to an ARP request from a data packet sending location.

13. The method of claim 9 wherein said sending comprises:
    adding to said data packet address information, other than said Ethernet address, pertaining to a destination of said data packet, said added information determined by said transmit portion of said bridge.

* * * * *